United States Patent [19]

Daiku

[11] 4,390,637
[45] Jun. 28, 1983

[54] X-RAY ABSORBING GLASS FOR A COLOR CATHODE RAY TUBE HAVING A CONTROLLED CHROMATICITY VALUE AND A SELECTIVE LIGHT ABSORPTION

[75] Inventor: Nobutaka Daiku, Otsu, Japan

[73] Assignee: Nippon Electric Glass Company, Limited, Otsu, Japan

[21] Appl. No.: 300,588

[22] Filed: Sep. 9, 1981

[30] Foreign Application Priority Data

Sep. 10, 1980 [JP] Japan .................. 55-126344
Jan. 29, 1981 [JP] Japan .................. 56-12676

[51] Int. Cl.³ ............................. C03C 3/10
[52] U.S. Cl. ........................... 501/64; 252/478; 313/480; 501/60; 501/62
[58] Field of Search ............... 501/64, 60, 62; 252/478; 313/480

[56] References Cited

U.S. PATENT DOCUMENTS

| | | | |
|---|---|---|---|
| 2,378,769 | 6/1945 | Hood | 501/64 |
| 3,143,683 | 8/1964 | Duncan et al. | 313/480 |
| 3,464,932 | 9/1969 | Connelly et al. | 501/62 |
| 3,663,246 | 5/1972 | LaGrouw | 501/62 |
| 3,723,354 | 3/1973 | Wada et al. | 501/62 |
| 3,805,107 | 4/1974 | Boyd | 501/64 |
| 3,915,722 | 10/1975 | Schaller | 501/64 |
| 3,987,330 | 10/1976 | Shell | 252/478 |

FOREIGN PATENT DOCUMENTS

| | | | |
|---|---|---|---|
| 1286539 | 1/1969 | Fed. Rep. of Germany . | |
| 55-113644 | 9/1980 | Japan | 313/480 |
| 1154500 | 6/1969 | United Kingdom . | |
| 2057422 | 4/1981 | United Kingdom | 313/480 |
| 451642 | 3/1975 | U.S.S.R. | 313/480 |

Primary Examiner—Mark Bell
Attorney, Agent, or Firm—Kurt Kelman

[57] ABSTRACT

A panel glass of a color cathode ray tube exhibiting a high absorption of X-radiation and an excellent resistance to electron and/or X-ray browning, which is modified by 0.1–5.0 wt % $Nd_2O_3$ to provide substantially higher relative light transmission in the green and in the red wavelengths of the visible spectrum and a greater selective light absorption in the yellow region of the spectrum, and which is further modified by 0.0005–0.05 wt % $Cr_2O_3$ and 0–2 wt % $Pr_6O_{11}$ to control the chromaticity value of the glass to be nearly equal to that of the light emitted from tricolor phosphor P22 and to suppress the dichroism of the glass for different ambient lights. Ingredients of the glass are as follows: 50–75% $SiO_2$, 0–5% $Al_2O_3$, 0–4% CaO, 0–3% MgO, 0–13% SrO, 0–16% BaO, 0–3% PbO, 0–3% ZnO, 0–4% $ZrO_2$, the sum of $SrO+BaO+PbO+ZnO+ZrO_2$ being 5–25%, 0–4% $Li_2O$, 3–15% $Na_2O$, 2–15% $K_2O$, the sum of $Na_2O+K_2O$ being 5–20%, 0–2%, $TiO_2$, 0–3% $CeO_2$, 0.1–5.0% $Nd_2O_3$, 0.0005–0.05% $Cr_2O_3$, and 0–2% $Pr_6O_{11}$.

5 Claims, 6 Drawing Figures

X-RAY ABSORBING GLASS FOR A COLOR CATHODE RAY TUBE HAVING A CONTROLLED CHROMATICITY VALUE AND A SELECTIVE LIGHT ABSORPTION

BACKGROUND OF THE INVENTION

This invention relates to glass for use as a color cathode ray tubes, and in particular, to X-ray absorbing glass for use as panels of color television tubes having a selective light absorption and a controlled chromaticity value.

In a conventional color cathode ray tube, such as a color TV tube, a plurality of sets of three red-, green- and blue-phosphor materials are deposited on the inner surfaces of the face or panel glass to form a phosphor coating for emitting red, green and blue lights. When the phosphor coating is excited by electron beams from electron guns mounted within the glass tube, a colored image is produced and is visible through the panel glass.

Such a color cathode ray tube must be able to display a clear color picture image under a usual illumination such as a fluorescent lamp or even in daylight. Accordingly, a color cathode ray tube is desired to have a high brightness and a good contrast while suppressing a reflection of an external light. To that end, it is desired that a glass bulb of a color cathode ray tube should be highly transparent for the red color light (the wavelength of about 610–780 m$\mu$), the green color light (about 500–570 m$\mu$) and the blue color light (about 430–460 m$\mu$) emitted from the phosphor materials, but should fully absorb the color light of the other wavelengths, for example, the yellow light (near 580 m$\mu$) such as the sunlight at dusk, to which the human eyes are most sensitive as accompanied by dazzling, to clearly reproduce the red, green and blue colors.

In order to preserve the contrast from degrading by any ambient light, it has been known in the prior art to add NiO and CoO to a panel glass of a color cathode ray tube so as to color the panel glass to decrease its light transmission characteristic. The colored glass has a chromaticity of the neutral color. However, since it exhibits a uniform transmission characteristic for all of lights of the visible spectrum, the red, the blue, and the green lights emitted from the phosphors are also absorbed so that the brightness of the image produced may be disadvantageously degraded.

Another known solution to maintain the high contrast even under any ambient light is to add 3–5 wt% neodynium oxide ($Nd_2O_3$) to a filter glass or a face glass of soda-lime-silica glass so that the glass may have selective absorption and transmittance properties by which the transmission of light in the red, the green, and the blue portions of the spectrum is permitted at a high rate but the transmission of the yellow portion is reduced, as disclosed in British Pat. No. 1,154,500. It is also disclosed in BRD Pat. No. 1,286,539 to add 2–8 wt% $Nd_2O_3$ to the panel glass of a color TV tube.

In U.S. Pat. No. 3,143,683, it is disclosed to add 0.05–0.4 wt% $Fe_2O_3$, 0.3–1.2 wt% $Nd_2O_3$, 0.01–0.05 wt% NiO, 0.002–0.006 wt% CoO, and 0.002–0.02 wt% Se to a panel glass of lime-soda-silica glass in order to produce the desired transmission properties in the glass.

However, neither one of the glasses disclosed in British Pat. No. 1,154,500, BRD Pat. No. 1,286,539 and U.S. Pat. No. 3,143,683 has an X-ray absorption and a resistance to electron and/or X-ray browning.

A conventional color cathode ray tube had suffered from problems that X-rays leak from the tube and that its face glass browns or discolors during long use, because electron beams are emitted to the face glass in the tube. In order to resolve such problems, glass including at least one of SrO, BaO, PbO, ZnO, $ZrO_2$ or $WO_3$ has been proposed and practically used which exhibits a high absorption of X-ray and an excellent resistance to electron and/or X-ray browning, as disclosed in, for example, U.S. Pat. Nos. 3,464,932, 3,663,246, 3,723,354 and others.

While, in use of the glass including $Nd_2O_3$ for the face glass of the color cathode ray tube as disclosed in British Pat. No. 1,154,500, BRD Pat. No. 1,286,539 and U.S. Pat. No. 3,143,683, the contrast and the color purity of the image produced by the three phosphor materials are not degraded by any ambient light illumination because of the selective light absorbing properties. However, the glass including $Nd_2O_3$ does not exhibit the neutral color for tricolor phosphor P22 illuminant, that is, its chromaticity point on the x and y coordinates by ICI (International Commission on Illumination) is different from that of the P22 per se. This means that a desired color light is correctly formed by controlled emission of the three red-, green-, and blue-phosphors.

Furthermore, the glass including $Nd_2O_3$ exhibits different colors by illumination of different neutral lights, for example, it is pinkish under the sunlight but bluish under the light from a fluorescent lamp. Such a nature of the glass as exhibits different colors under the sunlight and the other usual neutral illumination, will be referred to as "dichroism" hereinafter. Therefore, the color image produced by a color TV tube which uses the panel glass including $Nd_2O_3$ varies in its color and contrast in dependence on whether it is viewed under the sunlight or a fluorescent lamp.

Therefore, even if the teaching in British Pat. No. 1,154,500 and others is merely applied on the X-ray absorbing and browning resistance glass as disclosed in U.S. Pat. No. 3,464,932 and others, no glass is obtained which exhibits the neutral color for P22 illuminant and which does not exhibit the dichroism for the sunlight and the light of a fluorescent lamp.

SUMMARY OF THE INVENTION

Accordingly, it is an object of this invention to provide an X-ray absorbing and non-discoloring glass for use in color cathode ray tubes which is improved in its light transmittance and absorption characteristics, without degrading other physical, optical and chemical properties.

It is another object of this invention to provide an X-ray absorbing and non-discoloring glass for use in color cathode ray tubes which exhibits the neutral color for tricolor P22 illuminant and has selective light absorption and transmittance characteristics by which the transmittance of light in the red, the green, and the blue portions of the spectrum is permitted at a high rate but the transmission of the yellow portion is reduced remarkably.

It is still another object of this invention to provide an X-ray absorbing and non-discoloring glass for use in color cathode ray tubes wherein the dichroism as described above is considerably suppressed.

It is yet another object of this invention to provide a glass achieving the objects described above without any economical problem and without any problem of a public hazard.

According to this invention, a glass for use in color cathode ray tubes is obtained which comprises a base glass composition exhibiting a high absorption of X-radiation and an excellent resistance to electron and/or X-ray browning, neodymium oxide ($Nd_2O_3$) modifying the base glass composition by incorporation therein of neodymium oxide to provide substantially higher relative light transmission in green and in the red wavelengths of the visible spectrum and greater selective light absorption in the yellow region of the visible spectrum, and chromium oxide ($Cr_2O_3$) added therein for removing dichroism for different ambient lights and for controlling the chromaticity value to be nearly equal to that of the light from tricolor phosphor P22.

The glass may comprise another addition of praseodymium oxide ($Pr_6O_{11}$) to aid the effect of the addition of the chromium oxide.

The amount of the chromium oxide is 0.0005–0.05 wt%, and more advantageously 0.0006–0.03 wt%.

The amount of the praseodymium oxide is 0–2 wt% and more advantageously 0–1.5 wt%.

A glass according to this invention preferably comprises, by weight, 50–75% $SiO_2$, 0–5% $Al_2O_3$, 0–4% CaO, 0–3% MgO, 0–13% SrO, 0–16% BaO, 0–3% PbO, 0–3% ZnO, 0–4% $ZrO_2$, the sum of SrO+BaO+PbO+ZnO+$ZrO_2$ being 5–25%, 0–4% $Li_2O$, 3–15% $Na_2O$, 2–15% $K_2O$, the sum of $Na_2O$+$K_2O$ being 5–20%, 0–2% $TiO_2$, 0–3% $CeO_2$, 0.1–5.0% $Nd_2O_3$, 0.0005–0.05% $Cr_2O_3$, and 0–2% $Pr_6O_{11}$, more advantageously, 55–70% $SiO_2$, 0.5–4% $Al_2O_3$, 0–3% CaO, 0–2% MgO, 10–23% of SrO+BaO+PbO+ZnO+$ZrO_2$, 0–2.5% $Li_2O$, 10–19% of $Na_2O$+$K_2O$, 0–1% $TiO_2$, 0.1–1% $CeO_2$, 0.3–5% $Nd_2O_3$, 0.0006–0.03% $Cr_2O_3$, and 0–1.5% $Pr_6O_{11}$.

Further objects, features and other aspects of this invention will be understood from the following detailed description of preferred embodiments of this invention referring to the accompanying drawings.

DETAILED DESCRIPTION OF PREFERRED EMBODIMENTS

Figure 1:
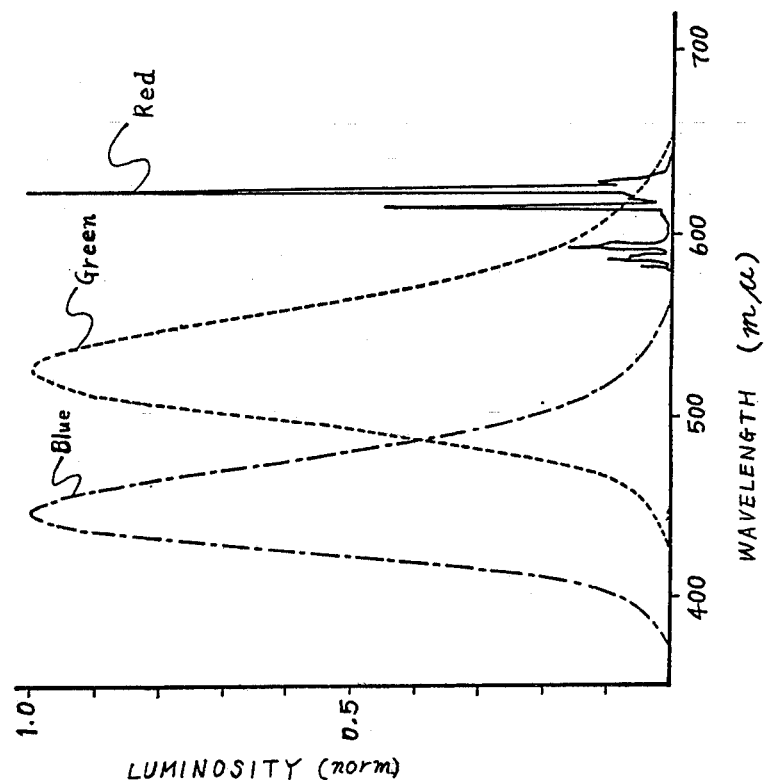
FIG. 1 is a view graphically illustrating the luminescence spectra of the red-, green-, and the blue-phosphor materials available for cathode ray tubes.

This invention attempts to add $Nd_2O_3$ and $Cr_2O_3$ into a base glass exhibiting the high X-ray absorption and an excellent resistance of discoloration due to X-ray and/or electron beam, to thereby provide a selective light absorption and transmittance characteristics of passing the light in the wavelength range of red, green and blue portions in the spectrum but absorbing the remaining light portions, to have a controlled chromaticity value to exhibit the neutral color for the tricolor P22 illuminant and to remarkably suppress the dichroism for the sunlight and a fluorescent lamp. Praseodymium oxide ($Pr_6O_{11}$) may be added to aid the effect of $Cr_2O_3$.

The following Table 1 lists the ingredients of the glass according to this invention.

In addition to the ingredients as listed in the Table 1, up to 0.5 wt% $Sb_2O_3$, up to 0.5 wt% $As_2O_3$ and up to 1% $F_2$ may be added as refining agents which are usually included in the base glass. Moreover, in order to control luminosity of the glass, up to 0.05 wt% NiO, up to 0.05 wt% CoO and up to 1 wt% $Fe_2O_3$ may be added.

TABLE 1

| | Ingredients | Amounts (wt %) | Preferable Amounts (wt %) |
|---|---|---|---|
| Base Glass | Silica ($SiO_2$) | 50–75 | 55– |
| | Alumina ($Al_2O_3$) | 0–5 | 0.5–4 |
| | Lime (CaO) | 0–4 | 0–3 |
| | Magnesia (MgO) | 0–3 | 0–2 |
| | Strontium oxide (SrO) | 0–13 | |
| | Barium oxide (BaO) | 0–16 | |
| | Lead oxide (PbO) | 0–3 } 5–25 | } 10–23 |
| | Zinc oxide (ZnO) | 0–3 | |
| | Zirconium oxide ($ZrO_2$) | 0–4 | |
| | Lithium oxide ($Li_2O$) | 0–4 | 0–2.5 |
| | Soda ($Na_2O$) | 3–15 } 5–20 | } 10–19 |
| | Potash ($K_2O$) | 2–15 | |
| | Titania ($TiO_2$) | 0–2 | 0–1 |
| | Ceria ($CeO_2$) | 0–3 | 0.1–1 |
| Neodymium oxide ($Nd_2O_3$) | | 0.1–5.0 | 0.3–5 |
| Chromium oxide ($Cr_2O_3$) | | 0.0005–0.05 | 0.0006–0.03 |
| Praseodymium oxide ($Pr_6O_{11}$) | | 0–2 | 0–1.5 |

Now description will be made on the reasons why the range of the base glass composition was limited as referred to above.

While $SiO_2$ is a principal glass forming oxide contained in a large amount, if it exceeds 75%, then solubility and workability become poor. If it is less than 50%, then a coefficient of thermal expansion becomes too large and also chemical durability of the glass is deteriorated. More preferably it should be 55–70%.

$Al_2O_3$ is effective for improving chemical durability of glass, but if it exceeds 5%, the glass becomes hardly soluble and disappearance of blisters therein is retarded. More preferably it should be 0.5–4%.

CaO and MgO are also effective for improving chemical durability of glass, but if CaO exceeds 4% or MgO exceeds 3%, the glass becomes liable to be subjected to devitrification. Preferably, CaO and MgO should be less than 3% and 2%, respectively.

SrO, BaO, PbO, ZnO and $ZrO_2$ are contained by 5–25% in total and more preferably by 10–23% in total for the purpose of making the glass have a high X-ray absorption capability, but in the event that SrO exceeds 13%, BaO exceeds 16%, ZnO exceeds 3% or $ZrO_2$ exceeds 4%, then melting of the glass becomes poor, and if PbO exceeds 3%, the glass becomes liable to be discolored to brown due to electron irradiation.

$Li_2O$ is effective for improving solubility of glass, but if $Li_2O$ exceeds 4%, the coefficient of thermal expansion becomes too large and a strain point is too much lowered. $Na_2O$ and $K_2O$ are contained by 5–20% in total and more preferably by 10–19% in total for the purpose of improving melting property of the glass and also adjusting a coefficient of thermal expansion of the glass, and if $Na_2O$ exceeds 15%, $K_2O$ exceeds 15% or the sum of $Na_2O+K_2O$ exceeds 20%, then chemical durability and electric insulation of the glass are deteriorated. On the other hand, if $Na_2O$ is less than 3%, $K_2O$ is less than 2% or the sum of $Na_2O+K_2O$ is less than 5%, then the melting becomes poor, the glass becomes liable to be subjected to devitrification and the strain point of the glass becomes too high, so that the glass is poor in workability.

$TiO_2$ and $CeO_2$ are added because they have the effect of preventing browning of glass due to X-ray or electron irradiation. The amount of addition is defined to be 2%, preferably 1%, or less for $TiO_2$ and 0–3%, preferably 0.1–1%, for $CeO_2$.

Next, the description will be made as to $Nd_2O_3$, $Cr_2O_3$ and $Pr_6O_{11}$ added to the base glass.

$Nd_2O_3$ is effective for providing the optical characteristics of selectively passing the light portions of the spectrum corresponding to the wavelength ranges of red (about 610 m$\mu$ or more), green (about 500–570 m$\mu$), and blue (about 430–460 m$\mu$) color lights emitted from the three red-, green-, and blue-phosphor materials as shown in FIG. 1, but absorbing the other light portions, especially the yellow portion of about 580 m$\mu$ wavelength region. Addition of $Nd_2O_3$ to the base glass, therefore, grades up the color purity and the contrast of the color image which is produced by excitation of the three phosphors and which is viewed through the panel glass under the sunlight or an illumination of a fluorescent lamp. In order to preserve the effect of $Nd_2O_3$, amount of $Nd_2O_3$ must be at least 0.1% and more particularly 0.3% or more. However, if the amount exceeds 5.0%, the glass is disadvantageously colored to be purplish red.

$Cr_2O_3$ is effective for controlling the chromaticity value of the X-ray absorbing and browning resistant base glass including $Nd_2O_3$ to exhibit the neutral color for P22 illuminant without degrading the selective light absorption and transmittance properties. $Cr_2O_3$ also serves to decrease a light transmission of red portion and blue portion of the spectrum of the base glass including $Nd_2O_3$, while maintaining the transmission for green portion of the spectrum. As a result, the dichroism of the glass including $Nd_2O_3$ for sunlight and the light of a fluorescent, and the lower luminosity of the green phosphor in comparison with that of each of red and blue phosphors is compensated. In order to preserve the effect of addition of $Cr_2O_3$, amount of $Cr_2O_3$ is 0.0005–0.05%, and more preferably, 0.0006–0.03%.

$Pr_6O_{11}$ is effective for decreasing a light transmission properties for blue portion of the spectrum without substantially decreasing the light transmission properties for red and green portions of the spectrum. Therefore, $Pr_6O_{11}$ serves to aid the effect of addition of $Cr_2O_3$ so that the glass including $Nd_2O_3$ exhibits more correctly the neutral color for P22 illuminant while the dichroism being more suppressed. If $Pr_6O_{11}$ is added to obtain the effect of addition of $Pr_6O_{11}$, amount of $Pr_6O_{11}$ should be 2% or less, and more preferably, 1.5% or less.

Examples of composition of the glass according to this invention are shown in the following Table 2. In addition, in the lower rows of Table 2 are respectively indicated coefficients of thermal expansion at 30°–380° C., strain points, softening points and coefficients of X-ray absorption at the wavelength of 0.6 Å of the respective kinds of glass.

In producing the sample glasses in Table 2, batches are prepared to include powdered materials of the ingredients of respective sample glasses. Respective batches are molten in furnaces at about 1200°–1250° C. Each molten glass is inserted in a mold to form a desired shape or a panel glass for a color TV tube. The panel glass formed is subjected to various tests. A portion of the data of the tests are shown in Table 2.

TABLE 2

|  | No. 1 | No. 2 | No. 3 | No. 4 | No. 5 | No. 6 | No. 7 | No. 8 | No. 9 | No. 10 |
| --- | --- | --- | --- | --- | --- | --- | --- | --- | --- | --- |
| $SiO_2$ | 60.9 | 60.9 | 62.6 | 68.1 | 62.2 | 61.0 | 61.1 | 65.4 | 60.7 | 66.6 |
| $Al_2O_3$ | 2.0 | 3.0 | 1.0 | 1.0 | 1.5 | 2.0 | 3.0 | 1.0 | 2.0 | 2.5 |
| CaO | — | — | 0.5 | 1.5 | 2.0 | — | 1.0 | 2.0 | — | — |
| MgO | — | — | 0.5 | — | 1.0 | — | 0.5 | 1.0 | — | — |
| SrO | 10.0 | 12.0 | 9.0 | 10.5 | 8.5 | 9.8 | 10.0 | 4.0 | 10.0 | 6.0 |
| BaO | 8.2 | 5.0 | 7.2 | 2.5 | 7.0 | 7.7 | 5.0 | 6.0 | 8.2 | 3.0 |
| PbO | — | — | 0.5 | 2.0 | — | — | 0.5 | 1.5 | — | 1.0 |
| ZnO | 1.0 | 2.0 | 1.0 | — | 0.5 | 0.5 | 1.0 | — | 1.0 | — |
| $ZrO_2$ | 1.2 | — | 1.0 | — | 1.5 | 1.2 | — | 0.5 | 1.2 | — |
| $Li_2O$ | — | — | 0.5 | 2.0 | — | — | 0.5 | 1.0 | — | — |
| $Na_2O$ | 7.7 | 5.9 | 7.2 | 7.2 | 7.5 | 7.9 | 7.0 | 8.0 | 7.7 | 6.5 |
| $K_2O$ | 7.7 | 9.7 | 7.2 | 3.2 | 7.5 | 7.8 | 7.0 | 4.0 | 7.7 | 7.5 |
| $TiO_2$ | 0.5 | 0.5 | 0.3 | 0.3 | 0.4 | 0.5 | 0.2 | 0.4 | 0.5 | 0.6 |
| $CeO_2$ | 0.3 | 0.3 | 0.5 | 0.5 | 0.4 | 0.3 | 0.5 | 0.4 | 0.3 | 0.3 |
| $Nd_2O_3$ | 0.5 | 0.5 | 1.0 | 1.0 | 2.0 | 1.0 | 2.0 | 4.0 | 0.5 | 5.0 |
| $Cr_2O_3$ | 0.0063 | 0.0024 | 0.0145 | 0.0104 | 0.0270 | 0.002 | 0.004 | 0.006 | 0.001 | 0.006 |
| $Pr_6O_{11}$ | — | — | — | — | — | 0.3 | 0.6 | 0.8 | 0.2 | 1.0 |
| NiO | — | — | — | 0.0029 | — | — | — | — | 0.003 | 0.001 |
| CoO | — | 0.0003 | — | 0.0007 | — | — | — | — | 0.0010 | 0.0004 |
| $Fe_2O_3$ | — | 0.20 | — | 0.20 | — | — | 0.10 | — | — | — |
| Coefficient of Thermal Expansion ($10^{-7}$/°C.) | 100.5 | 101.0 | 98.5 | 94.0 | 100.0 | 100.5 | 97.0 | 93.0 | 100.5 | 90.0 |
| Strain point (°C.) | 477 | 483 | 472 | 440 | 495 | 478 | 480 | 475 | 478 | 483 |
| Softening point (°C.) | 704 | 710 | 698 | 665 | 722 | 705 | 705 | 705 | 706 | 711 |
| Coefficient of X-ray absorption (0.6 Å, cm$^{-1}$) | 29.5 | 29.0 | 29.0 | 26.5 | 27.0 | 29.5 | 28.0 | 26.0 | 29.7 | 25.0 |

In manufacturing the glass of this invention, the same conditions of times and temperatures for melting, refining, forming, annealing and tempering it are employed as in the conventional processes for producing panel glasses. Accordingly, the method for producing the glass of this invention is not described in detail, for purpose of simplification of the description.

The transmission curve and the chromaticity of the glass of this invention, which are not shown in Table 2, will be described below referring to FIGS. 2–6 in connection with Samples Nos. 1 and 6.

Figure 2:
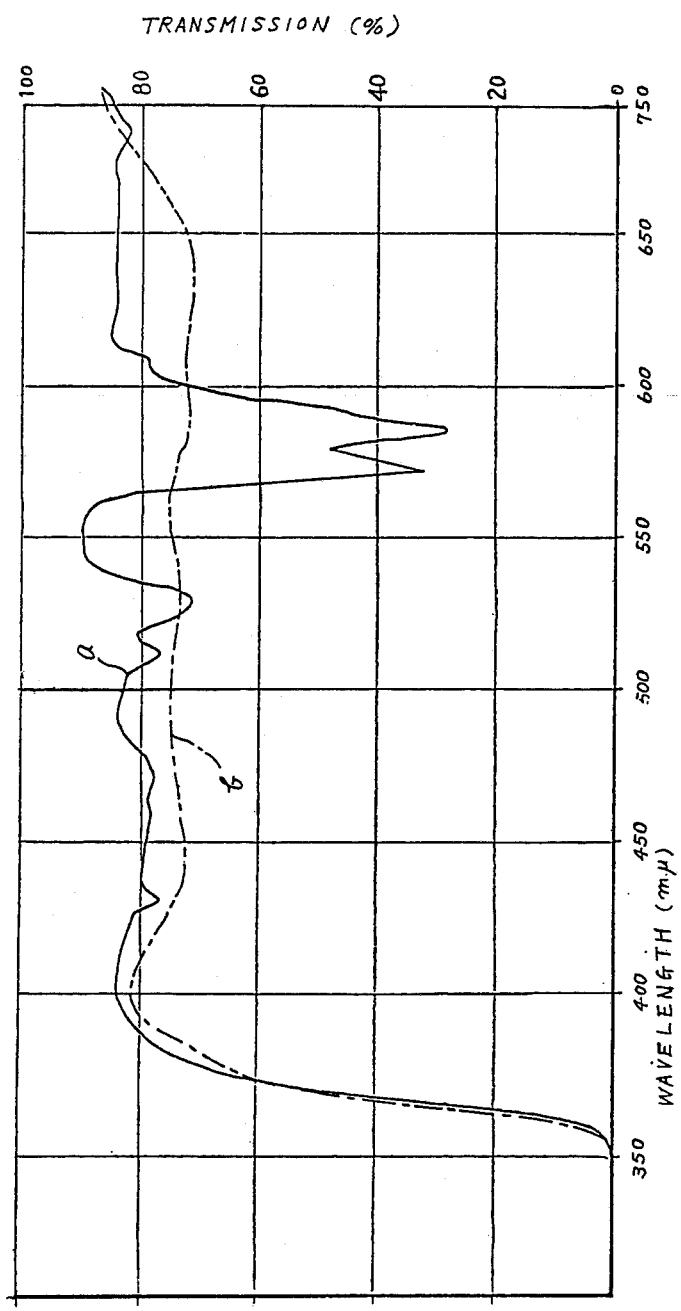
FIG. 2 is a view graphically illustrating the transmission curve of the glass of Sample No. 1 according to this invention together with that of a known panel glass including NiO and CoO.

Referring to FIG. 2, a transmission curve a of Sample No. 1 glass of a thickness of 10 mm in Table 2 according to this invention is shown therein. As will be noted from the curve a, the yellow light portion (about 580 m$\mu$) of the spectrum is remarkably absorbed. This is compared with another flat curve b which represents the light transmission of a glass which includes NiO and CoO in place of $Nd_2O_3$ and $Cr_2O_3$ of Sample No. 1 glass according to the known method as described hereinbefore.

Figure 3:
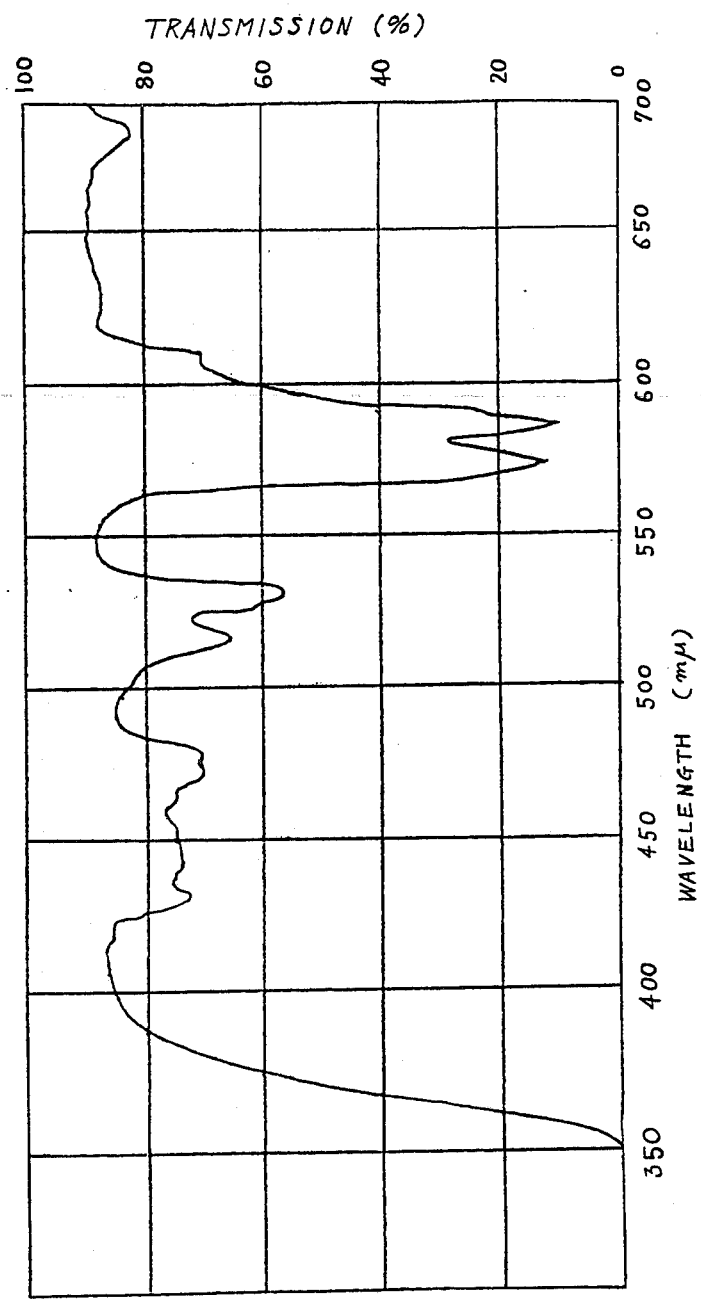
FIG. 3 is a view graphically illustrating the transmission curve of the glass of Sample No. 6 according to this invention.

Referring to FIG. 3, a transmission curve of Sample No. 6 of a thickness of 10 mm in Table 2 is shown therein. The curve is also compared with the flat curve b in FIG. 2.

Thus, the glasses of Samples Nos. 1 and 6 have selective absorbing and transmittance properties wherein the transmittance of light in the red, the green, and the blue portions of the spectrum is permitted at a high rate but the transmission of the yellow portion is reduced considerably.

Comparing the transmission curves of the glasses of this invention in FIGS. 2 and 3 with the transmission curve in FIG. 2 of British Pat. No. 1,154,500, it will be noted that transmission of the glass of this invention for red and blue portions of the spectrum decreases in comparison with the glass of British Pat. No. 1,154,500 including $Nd_2O_3$ but neither $Cr_2O_3$ nor $Pr_6O_{11}$. Therefore, it will be understood that addition of $Cr_2O_3$ together with or without $Pr_6O_{11}$ into a glass including $Nd_2O_3$ serves to decrease the transmission of the glass for the red and blue portions of the spectrum.

The glass including $Cr_2O_3$ together with or without $Pr_6O_{11}$ in addition to $Nd_2O_3$ exhibits the neutral color for P22 illuminant due to the effect of $Cr_2O_3$ and $Pr_6O_{11}$.

Figure 4:
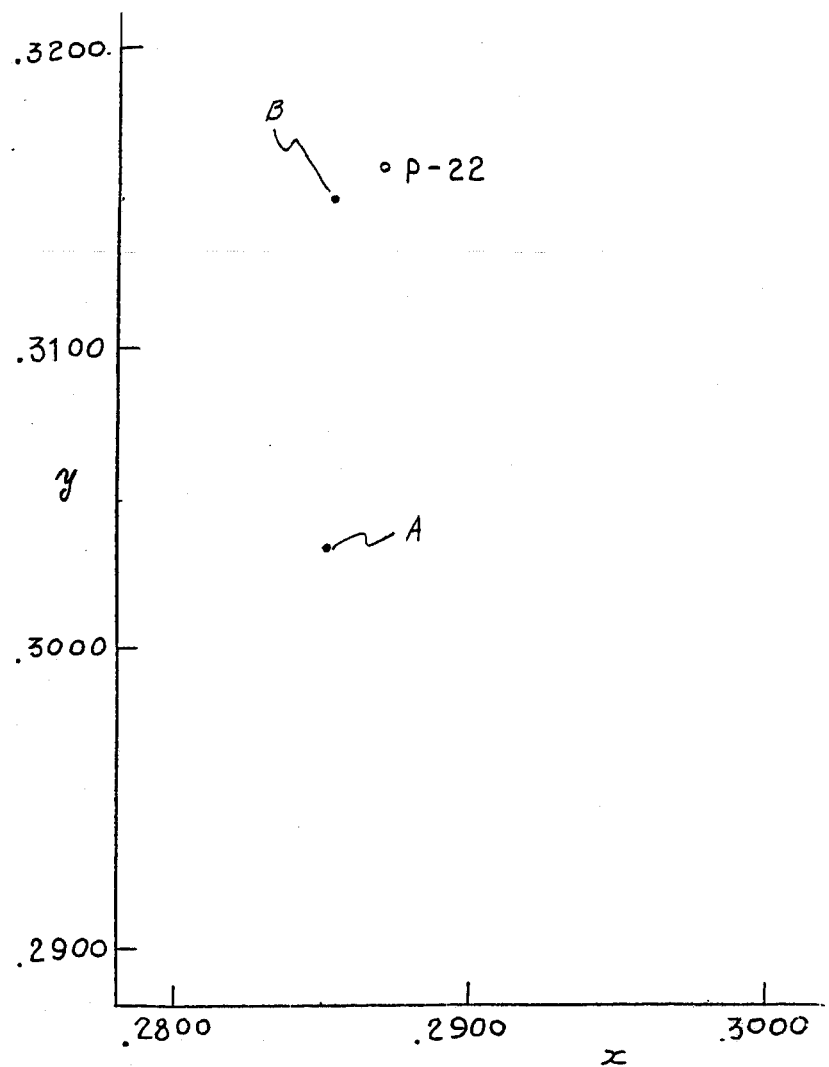
FIG. 4 is a chromaticity diagram illustrating a chromaticity value of the glass of Sample No. 1 according to this invention.

Referring to FIG. 4, a chromaticity value of Sample No. 1 glass of Table 1 is shown at a point B. Various chromaticity points are plotted on x and y coordinates determined by ICI, that is, a chromaticity value is plotted which is obtained at a time when a glass having a thickness of 11.43 mm is illuminated by a white color emitted from the tricolor P22 illuminant. The chromaticity value of the light of P22 illuminant is $x=0.2870$ and $y=0.3160$ which is shown at a point indicated by P22 in FIG. 4. The chromaticity of Sample No. 1 glass is plotted at a point indicated by B, that is, $x=0.2853$ and $y=0.3151$. On the other hand, the chromaticity value of a glass which is the Sample No. 1 glass without $Cr_2O_3$ is $x=0.2852$ and $y=0.3032$ as plotted at a point A. It will be understood from FIG. 4 that the chromaticity value of a glass including $Nd_2O_3$ is controlled by addition of $Cr_2O_3$ to be nearly equal to that of P22, that is, the glass becomes to exhibit the neutral color for P22 illuminant by addition of $Cr_2O_3$.

Figure 5:
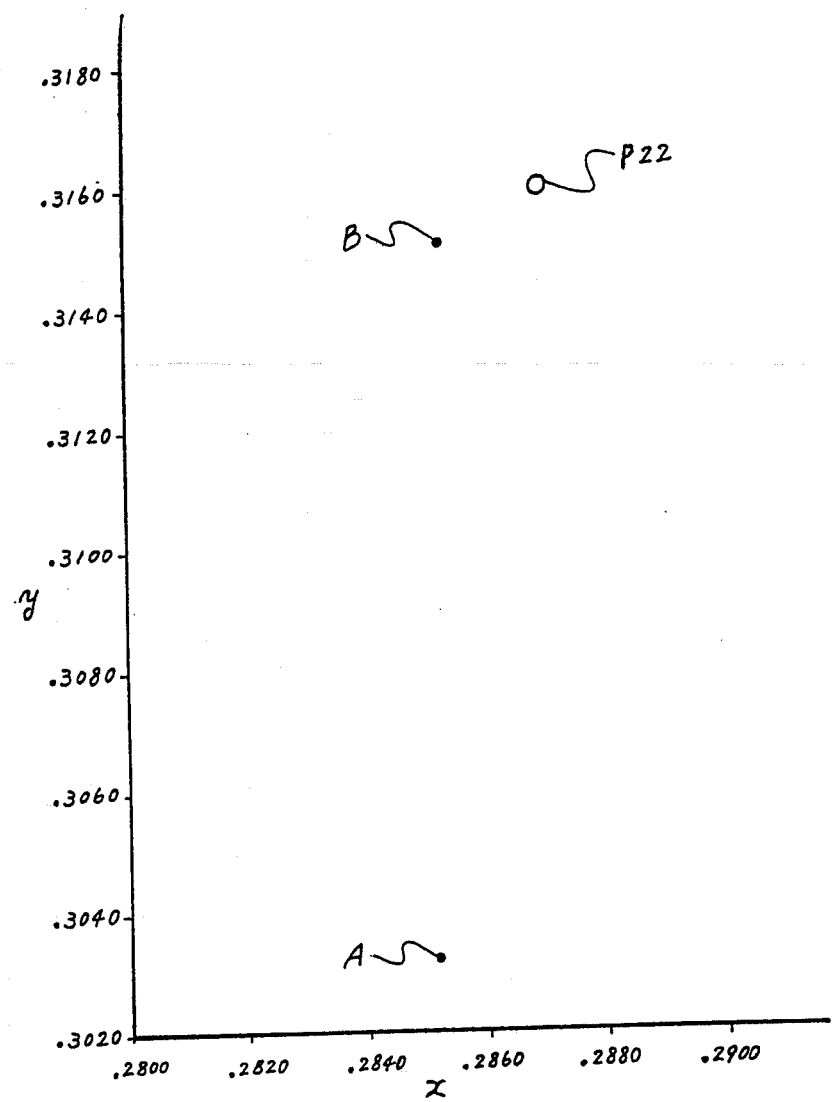
FIG. 5 is a chromaticity diagram illustrating a chromaticity value of the glass of Sample No. 6 according to this invention.

Referring to FIG. 5, a chromaticity value of No. 6 glass is plotted at B on the x and y coordinates. A chromaticity point A represents the value of a glass composed of the similar ingredients of Sample No. 6 in Table 2 except $Cr_2O_3$ and $Pr_6O_{11}$. It is noted from FIG. 5 that addition of $Cr_2O_3$ and $Pr_6O_{11}$ reduces the difference of the chromaticity value of the glass including $Nd_2O_3$ from that of P22 illuminant. Accordingly, the glass including $Cr_2O_3$ and $Pr_6O_{11}$ in addition to $Nd_2O_3$ exhibits the neutral color for P22 illuminant.

Figure 6:
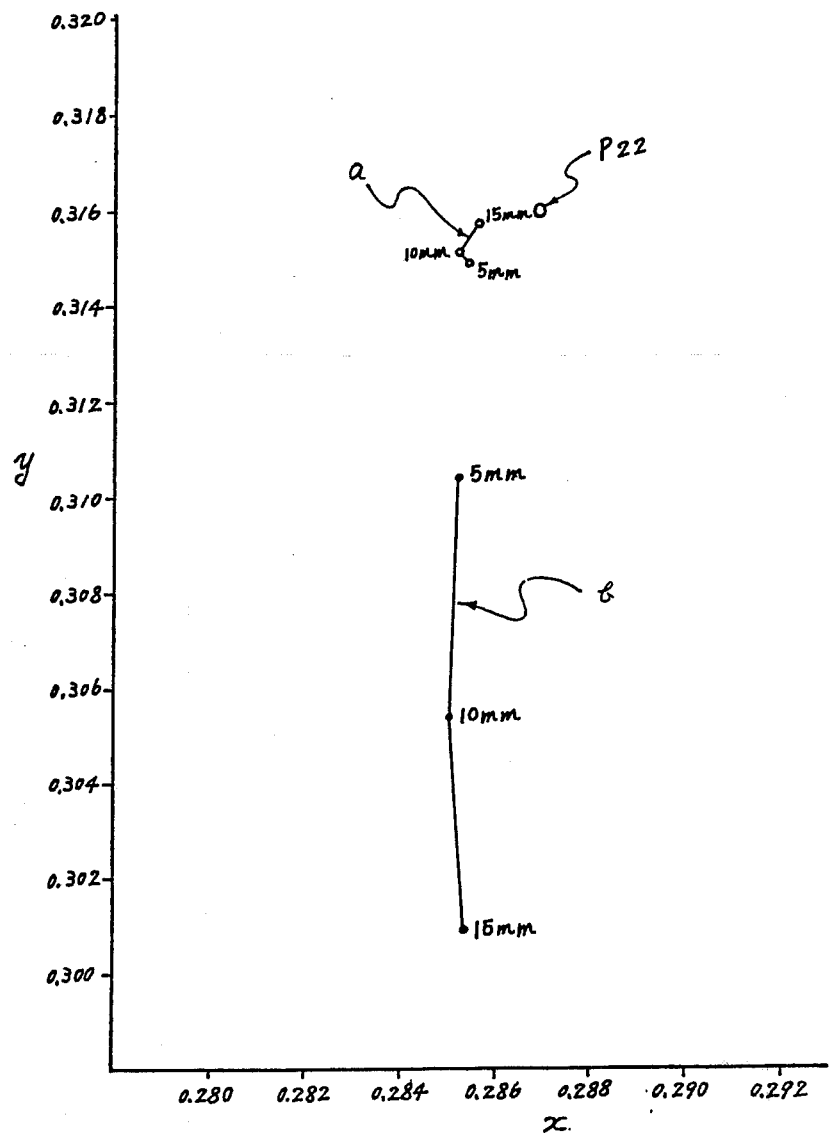
FIG. 6 is a chromaticity diagram illustrating variation of chromaticity values of the glass of Sample No. 1 according to this invention and the glass without $Cr_2O_3$ in dependence on variation of their thickness.

Referring to FIG. 6, variation of chromaticity value of the No. 1 glass in Table 2 in dependence on variation of its thickness is illustrated by a line a, and that of the glass similar to the No. 1 glass but without $Cr_2O_3$ is illustrated by a line b. Three points on each line a and b represent chromaticity points of respective glasses having thickness of sizes described near the points. From comparison of line a with b, it will be understood that the addition of $Cr_2O_3$ to the glass including $Nd_2O_3$ brings about the reduced variation of the chromaticity value in dependence on different thickness of the glass.

Sample glasses in Table 2 were observed under sunlight and under a fluorescent lamp. Any one of the glasses did not almost exhibits color change between respective observation under sunlight and under fluorescent lamp, but they almost appeared to exhibit neutral color. That is, it was appreciated that the glass according to this invention did not almost exhibit the dichroism. This will be understood by those skilled in the art from a fact that transmission of red and blue portions of the spectrum decreases by addition of $Cr_2O_3$ but that of green portion is not almost changed, as described above, and from another fact that the chromaticity value of the glass becomes nearly equal to that of the white light from tricolor phosphor P22.

It brings about another advantage that transmission of red and blue portions of the spectrum decreased by addition of $Cr_2O_3$ but that of green portion is not almost changed. In conventional phosphor materials, luminous effect of green-phosphor materials is lower than that of red- and blue-phosphors. Accordingly, the higher electric energy has been used to excite the green-phosphor than the red-phosphor and the blue-phosphor. But since the low luminous effect of green phosphor in relation to the other phosphors is compensated by the transmission characteristic of the glass according to this invention, it is possible to design peak currents for exciting the red-, the green- and the blue-phosphors to be substantially equal to one another.

What is claimed is:

1. A glass for use in color cathode ray tube having the composition essentially consisting, by weight, of 50–75% $SiO_2$, 0–5% $Al_2O_3$, 0–4% CaO, 0–3% MgO, 0–13% SrO, 0–16% BaO, 0–3% PbO, 0–3% ZnO, 0–4% $ZrO_2$, the sum of SrO+BaO+PbO+ZnO+$ZrO_2$ being 5–25%, 0–4% $Li_2O$, 3–15% $Na_2O$, 2–15% $K_2O$, the sum of $Na_2O+K_2O$ being 5–20%, 0–2% $TiO_2$, 0–3% $CeO_2$, 0.1–5.0% $Nd_2O_3$, 0.0005–0.05% $Cr_2O_3$, and 0–2% $Pr_6O_{11}$.

2. A glass as claimed in claim 1, wherein said composition comprises, by weight, 55–70% $SiO_2$, 0.5–4% $Al_2O_3$, 0–3% CaO, 0–2% MgO, 10–23% of SrO+BaO+PbO+ZnO+$ZrO_2$, 0–2.5% $Li_2O$, 10–19% of $Na_2O+K_2O$, 0–1% $TiO_2$, 0.1–1% $CeO_2$, 0.3–5% $Nd_2O_3$, 0.0006–0.03% $Cr_2O_3$, and 0–1.5% $Pr_6O_{11}$.

3. A glass as claimed in claim 1, wherein the amount of said neodium oxide ($Nd_2O_3$) is 0.3–5% by weight of the glass.

4. A glass as claimed in claim 1, wherein the amount of said chromium oxide is 0.0006–0.03% by weight of the glass.

5. A glass as claimed in claim 1, wherein the amount of said praseodymium oxide is 0–1.5% by weight of the glass.

* * * * *